March 11, 1930.          H. AHLIN ET AL          1,749,796
LIFTER
Filed Feb. 16, 1928

Patented Mar. 11, 1930

1,749,796

UNITED STATES PATENT OFFICE

HJALMAR AHLIN AND AXEL AHLIN, OF CHICAGO, ILLINOIS

LIFTER

Application filed February 16, 1928. Serial No. 254,756.

This invention relates to improvements in lifters and its chief object is to provide a simple efficient device adapted to lift hot pans, griddles, pie pans and plates, kettle covers, etc., without burning or soiling one's fingers.

A further object is to provide a device of this type that is cheap to manufacture, of simple construction and that is positive and efficient in operation.

With the foregoing and other objects in view the invention consists in the combination and arrangement of parts to be hereinafter fully described, pointed out in the appended claims and illustrated in the accompanying drawing which forms a part of this application and in which—

Figure 1:
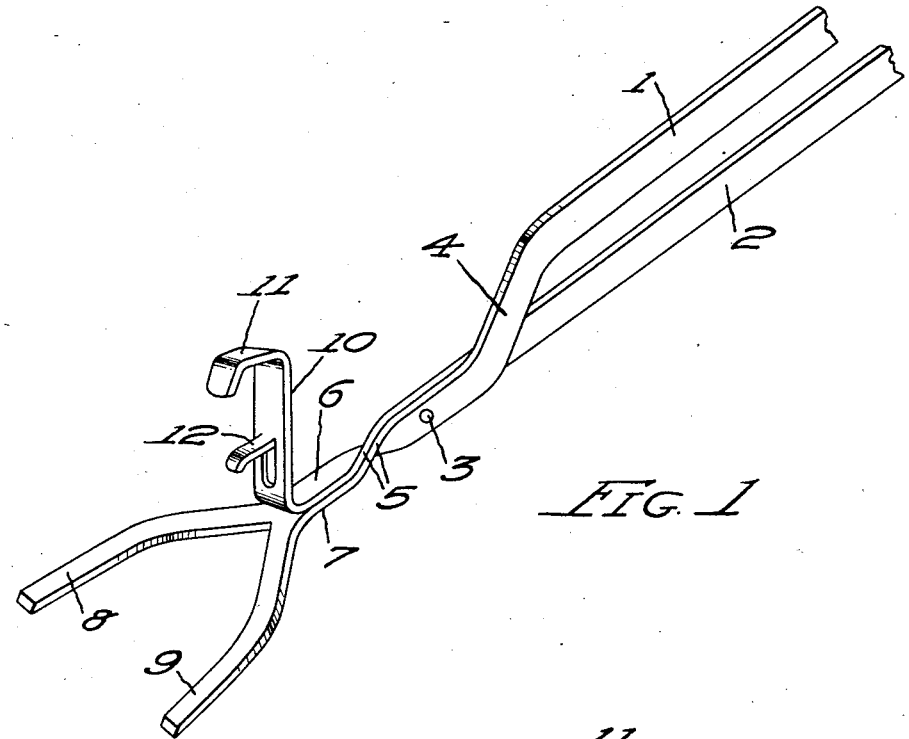
Figure 2:
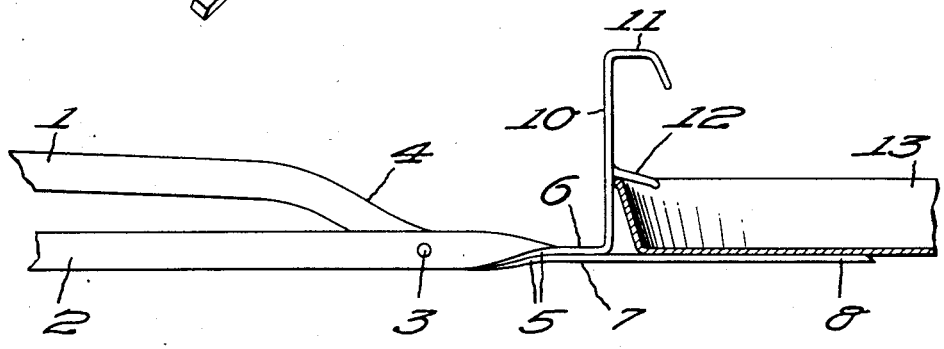

Fig. 1 is a perspective view of the lifter, a portion of the handles being broken away, Fig. 2 is a view of the lifter in side elevation illustrating one application thereof.

Like reference characters denote corresponding parts in both views.

The lifter comprises a pair of arms pivotally connected together quite after the fashion of a pair of tongs. It is capable of a variety of uses. The lifter may be used to lift a variety of cooking utensils, the utensil covers, plates, etc., and it is very handy when the necessity arises for handling greasy articles, hot pans, etc.

The handle-end of the lifter may be employed to lift pot covers, kettle covers, etc., that are provided with knobs, the handle members engaging the knob stem between the knob and the cover. When camping or picknicking the lifter may be used to support a utensil over a fire while cooking a meal etc.

The lifter comprises the metal bars 1 and 2 connected together by the pivot 3. The bars 1 and 2 are of flat shape and at the handle-end thereof are positioned edgewise, the handle end of the bar 2 being straight and the handle end of the bar 1 being also straight except for the bend 4 therein. Beyond the pivot 3 with respect to the handle the bars 1 and 2 are formed with a slight twist 5 immediately beyond which each bar is disposed flat and in a position at right angles to that of the handle end, the short flat portions of said bars forming jaws and being denoted by the numerals 6, 7.

The bar 1 beyond its short flat portion 7 is bifurcated to form the prongs 8, 9 which are spread wide apart and the bar 2 beyond its short flat portion 6 is bent at right angles to said portion to form the upright portion 10 which terminates in the hook-like end 11. A tongue 12 is stamped from the upright portion 10 upon the same side thereof as the hook 11. In use the forked ends 8, 9 of the bar 1 may be inserted beneath a pie pan or plate 13, the tongue 12 then engaging with the upper edge of said pan as shown. A griddle, flat plate or the like may be lifted by the prongs 8, 9, the edge of the griddle or plate being received between the flat portions 6, 7 of the bars and thereby held firmly. A deep pan or kettle may be supported upon the prongs 8, 9 while the hook 11 engages the rim thereof. The handle end of the tool may be used to lift a cover, the cover knob being engaged by the bars 1 and 2 at their handle end while the lifter is supported in the hand by or at its twisted portion.

What is claimed is:—

1. In a lifter, a pair of flat bars pivotally connected together and disposed edgewise at one end to form a handle, said bars beyond their pivot, with respect to said handle, being twisted to form cooperating flat jaws disposed at right angles to said handle, the free end of one bar beyond its flat jaw being bifurcated and the resultant prongs spread apart, the other bar beyond its flat jaw being bent at right angles thereto and terminating in a hook, and a tongue struck from the said bent portion.

2. In a lifter, a pair of flat bars pivotally connected together and disposed edgewise at one end to form a handle, one of said bars being curved contiguous to said pivot, said bars at their handle end being adapted to support a utensil cover by its knob, said bars beyond their pivot, with respect to said handle, being twisted to form cooperating flat short jaws disposed at right angles to said handle, the free end of one bar beyond its flat jaw being bifurcated and the prongs spread apart, the other bar beyond its flat jaw being bent outwardly at right angles thereto and terminating in a hook, and a tongue struck from said bent portion upon the same side thereof as said hook.

In testimony that we claim the foregoing as our own we have hereto affixed our signatures.

HJALMAR AHLIN.
AXEL AHLIN.